United States Patent [19]

Kadron

[11] 3,714,582

[45] Jan. 30, 1973

[54] AUTOMATIC BEAT FREQUENCY OSCILLATOR SWITCH FOR AN AIRBORNE AUTOMATIC DIRECTION FINDER

[75] Inventor: Stanley F. Kadron, Lighthouse Point, Fla.

[73] Assignee: The Bendix Corporation

[22] Filed: April 8, 1970

[21] Appl. No.: 26,481

[52] U.S. Cl. ..................325/341, 325/478, 329/126, 331/172

[51] Int. Cl. ..............................................H04b 1/32

[58] Field of Search......325/341, 342, 329, 478, 479, 325/481; 331/172; 329/126

[56] References Cited

UNITED STATES PATENTS 2,544,740 3/1951 Varela................................325/341

3,564,419 2/1971 Yackish................................325/478

3,482,166 12/1964 Gleason..............................331/172 X

*Primary Examiner*—Benjamin A. Borchelt

*Assistant Examiner*—R. Kinberg

*Attorney*—Plante, Arens, Hartz, Smith and Thompson, Bruce L. Lamb and William G. Christoforo

[57] ABSTRACT

An automatic switching circuit for an airborne automatic direction finder energizes a beat frequency oscillator in the presence of beacon emissions in the form of interrupted CW signals at morse rates thereby rendering these beacon emissions upon receipt at the airborne automatic direction finder audible to the pilot. A counter counts pulses on the receiver AGC bus corresponding to the beacon emissions. If the number of pulses counted during a predetermined time period satisfies a known criteria, the beat frequency oscillator is energized.

8 Claims, 3 Drawing Figures

INVENTOR
STANLEY F. KADRON
BY
William G. Christoforo
ATTORNEY

AUTOMATIC BEAT FREQUENCY OSCILLATOR SWITCH FOR AN AIRBORNE AUTOMATIC DIRECTION FINDER

BACKGROUND OF THE INVENTION

This invention relates to automatic direction finders and more particularly to automatic switching circuits suitable for energizing beat frequency oscillators for rendering received A-1 beacon emissions audible when the direction finder receiver intercepts said emissions.

There is still a need for a beat frequency oscillator in the modern automatic direction finder receiver due to the number of nondirectional beacons that identify using A-1 emissions. In Europe for example, both A-1 and A-2 emissions are used for nondirectional beacon identification. The procedure and codes used for identification of the nondirectional beacon stations is specified by the International Civil Aviation Organization which in their Annex 10 has directed that nondirectional beacons utilizing A-1 identification shall utilize CW signals interrupted at morse rates at approximately seven words per minute and shall repeat the identification at approximately 1 minute intervals.

It is thus an object of this invention to make use of characteristics characteristics of the A-1 emissions to automatically energize a beat frequency oscillator in an airborne automatic direction finder so as to render said emissions audible.

Another object of this invention is to provide an automatic switching circuit of the type described which is compatible for use in modern automatic direction finders.

Related objects and advantages of the invention will become apparent as the description proceeds.

SUMMARY OF THE INVENTION

The above objects of the invention are accomplished by sensing the presence of pulses on the automatic gain control bus of the automatic direction finder. These pulses correspond to the A-1 beacon emissions which are received by the direction finder. A differentiator and one-shot multivibrator, in response to a pulse on the AGC bus, generate a one-shot output pulse having a 15 milli-second duration and a usable level of amplitude. The output of this one-shot enables a counter for a period of about 3 seconds and provides a first pulse to the counter. If three additional pulses are detected on the AGC bus during the three second counter enable period, a counter output pulse is applied to a second one-shot which has an ON period of approximately 1.3 minutes. Its output energizes the beat frequency oscillator switch thereby allowing the directional finder to provide the audio tone necessary for A-1 identification. Additional pulses on the AGC line which satisfy the time requirements of the switching circuit will sustain this 1.3 minute one-shot to provide continuous beat frequency oscillator operation. When the input signal is such that four pulses in a three second time period are not counted, the output of the 1.3 minute one-shot is self disabling and the beat frequency oscillator is switched off.

PREFERRED EMBODIMENT OF THE INVENTION

Figure 1:
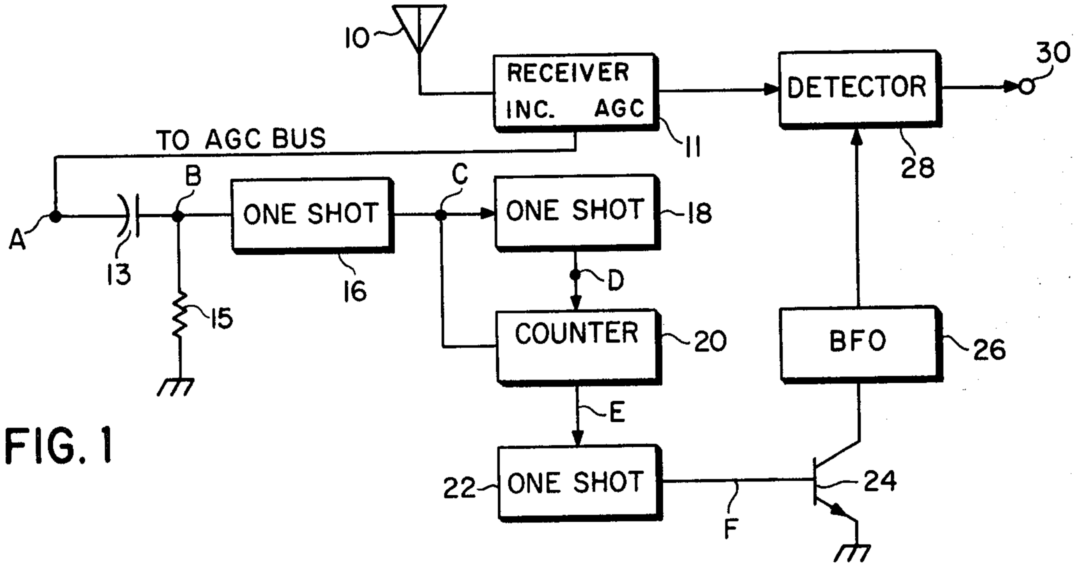
FIG. 1 is a block diagram illustrating an embodiment of the invention.

Referring first to FIG. 1 an automatic direction finder receiver 11 receives from antenna 10 radio frequency emissions transmitted from a ground station beacon. Receiver 11 includes the usual automatic gain control circuits. If the ground station beacon is transmitting A-1 emissions, that is, continuous wave signals interrupted at a morse rate, it is well known to those skilled in the automatic direction finder art that pulses corresponding to said interruptions will appear on the receiver automatic gain control bus. These pulses on the ADF receiver AGC bus are sampled at terminal A, the input terminal to the automatic beat frequency oscillator switching circuit. In response to these pulses a differentiator comprised of capacitor 13 and resistor 15 generates differentiator output signals which appear at terminal B, the input terminal to one-shot 16, which in response thereto generates output pulses standardized both as to amplitude and width, said width being less than the minimum possible period of the pulses on the AGC bus. Since the AGC bus pulses are generally of identical period with the A-1 beacon emissions whose characteristics are predetermined and known to the system designer, it is well within the state of the art for the system designer to provide a one-shot meeting the above requirement. The one-shot 16 output pulses appear on terminal C, which is a common input terminal of one-shot 18 and counter means 20. Counter means 20 is suitably a digital counter and gating circuit of of the type well known in the art which generates an output signal when a predetermined count is obtained. If, while one-shot 18 is in its stable state a pulse appears on terminal C, this latter one-shot will be triggered to its unstable state for a period which is set by the system designer to be relatively long with respect to the width of the pulses appearing on terminal C. The one-shot 18 output pulse is applied to terminal D where during its period it causes counter means 20 to be reset and enabled. The terminal C pulse, which acting through one-shot 18 enables counter means 20, along with subsequent terminal C pulses generated while counter means 20 is enabled are counted with an output being generated on line E when the predetermined count is attained. This counter output triggers one-shot 22. The period of the one-shot 22 output pulse is predetermined to be extremely long with respect to the period of the one-shot 18 output pulse, with the output pulse of one-shot 22 being applied to the base electrode of transistor 24 thereby to render this transistor conductive. Beat frequency oscillator 26 is thus energized suitably by completing a power circuit therethrough. This is represented schematically by the collector-emitter circuit of transistor 24 which is now conductive to connect beat frequency oscillator 26 to ground to thus complete its power circuit which is not shown but which is well known to the art. The output frequency of beat frequency oscillator 26 is applied to detector 28 wherein it is beat against the IF frequency received from ADF receiver 11 with a resultant audio frequency being applied on output terminal 30. It should now be obvious that a suitable audio amplifier and loudspeaker may be connected to output terminal 30 and thus render the audio signals appearing thereon audible.

Figure 2:
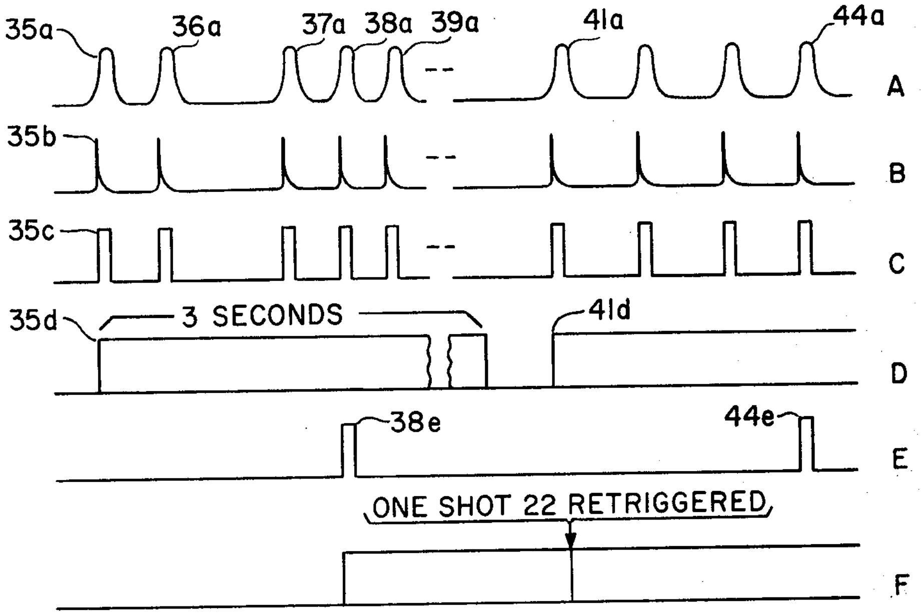
FIG. 2 is a timing diagram which is helpful in explaining the operation of the device illustrated in FIG. 1.

Referring now also to FIG. 2 wherein there is seen various line graphs having a common time scale and wherein the letter designation of said graphs refers to the like terminal in the diagram of FIg. 1, the graph showing a representative electrical signal which appears on that terminal during the operation of the automatic switching circuit. The timing constants which are assigned to the various elements of FIG. 1 and which are described below are constants suitable for use with this type of circuit assuming that the A-1 emissions will have those characteristics dictated by the International Civil Aviation Organization. As previously explained, the International Civil Aviation Organization has specified that beacons utilizing A-1 identification shall transmit at approximately seven words per minute and repeat the identification at approximately 1 minute intervals. A continuous wave transmission having at least four interruptions per 3 second period that identification is being transmitted will satisfy the above characteristics. Accordingly, one-shot 16 was designed to generate an output pulse having a 50 millisecond duration, one-shot 18 designed to have a 3 second duration output pulse, counter 20 is designed to generate an output pulse when obtaining a count of four and one-shot 22 is designed to provide a 1.3 minute duration output pulse. Of course, the constants of the device can be varied to favor practically any identification speed and repetitive time period.

Returning now to the figures and more particularly to FIG. 2, there is seen that a first pulse at terminal A,**34*a*, produces a differentiated spike 34*b* at terminal B, a pulse 34*c* at terminal C of standardized width and amplitude and a pulse 35*d* at terminal D having a period of 3 seconds. This last pulse it will be remembered resets and energizes counter means 20. The first four pulses 34*a*, 36*a*, 37*a* and 38*a*, are counted in counter means 20 which thereupon generates the pulse 38*e* on line E. Pulse 38*e* triggers one-shot 22 to generate the pulse on line F as in FIG. 2F. It will be noted that pulses subsequent to pulse 38*a*, which occur during the 3 second. of pulse 38*d*, for example pulse 39*a*, have no affect upon the switching circuit. However, the first pulse occuring after the termination of pulse 35*d*, for example pulse 41*a*, triggers one-shot 18 to generate another 3 second period pulse, for example 41*d*. The fourth pulse, for example 44*a*, appearing during the 3 second period of pulse 41*d*, fills counter means 20 causing it to generate pulse 44*e* which retriggers one-shot 22. It is normally desirable that the beat frequency oscillator remain energized during the entire time that A-1 emissions are being received. This is easily accomplished by providing a one-shot having a sustaining input for one-shot 22. This type of one-shot is described more fully below, it being sufficient for the time to explain that such a one-shot is reset to its initial unstable state each time it is triggered by an input pulse even though it is at that time in its unstable state. In this manner so long as A-1 identifications which are transmitted at 1 minute intervals are received by the airborne ADF receiver, one-shot 22 will generate a continuous output pulse thereby continuously energizing beat frequency oscillator 26. If at any time the A-1 emissions are not received by the airborne ADF receiver for 1.3 minutes, one-shot 22 will return to its stable state thus allowing transistor 24 to become non-conductive and beat frequency oscillator 26** to turn off.

Figure 3:
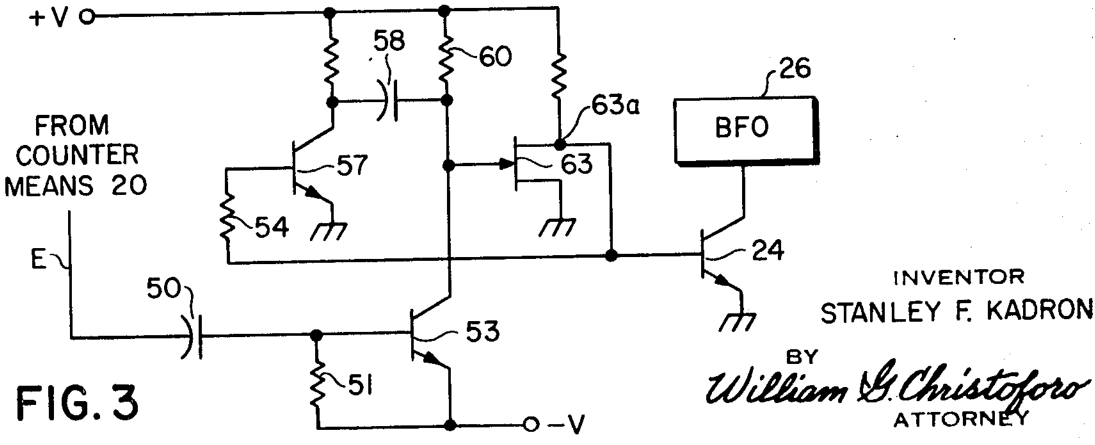
FIG. 3 is a schematic of a one-shot having a sustaining input which is suitable for use in the invention.

Referring now to FIG. 3 wherein there is shown a schematic of a one-shot having a sustaining input which is suitable for use as one-shot 22 in FIG. 1. It should be obvious that transistors 57 and 63 comprise a standard one-shot having a normal stable state wherein transistor 57 is off and transistor 63 is conductive. However, it differs from the standard one-shot in that the triggering signal is applied to the gate of transistor 63 in the following manner. The output signal from counter means 20 of FIG. 1, which it will be remembered in this embodiment is a pulse when the counter reaches a count of four, is applied along line E and through coupling capacitor 50 to the base electrode of transistor 53, which is normally off, but which is now biased on by the resultant voltage drop across resistor 51 which shunts the transistor base-emitter electrodes. It will be noted that a source of negative voltage potential −V is connected to the emitter electrode of transistor 53 and a source of positive voltage potential +V is connected to the collector electrode of transistor 53 through resistor 60. Thus, since transistor 53 is now conductive, the −V potential is impressed on the gate of transistor 63 which thus turns off and whose drain electrode **63*a* now approaches potential +V. This positive potential is applied to the base electrode of switching transistor 24 (also seen in FIG. 1) to thus energize beat frequency oscillator 26 as earlier described. Feedback in the manner normal for a one-shot from drain 63*a* through resistor 54 to the base electrode of transistor 57 turns on this latter transistor. Also in a manner normal for a one-shot, the one-shot remains in this unstable state until the negative potential originally impressed on the gate of transistor 63 and hence stored on capacitor 58 is discharged through resistor 60**.

Transistor 53 remains conductive for only a short while, the triggering pulse from counter means 20 being effective only at its leading edge when coupled through capacitor 50 and the resulting bias voltage being rapidly discharged through resistor 51.

If counter means 20 generates another output signal while the one-shot is in its unstable state transistor 53 again becomes conductive and the −V potential is again stored on capacitor 58 so that the one-shot is in effect retriggered and can thus be continuously held in its unstable state so long as the period between signals form counter means 20 is shorter than the period of the one-shot output.

It from be understood that the appended claims describe the true scope and spirit of the invention.

The invention claimed is:

1. In an airborne automatic direction finder having a receiver for receiving pulsed signals and a normally unenergized beat frequency oscillator, means for energizing said beat frequency oscillator comprising:

counting means for counting the pulsed received signals during a predetermined time period and for generating a counting means output signal upon said counting means attaining a predetermined count: and, means responsive to said counting means output signal for energizing said beat frequency oscillator.

2. Means for energizing said beat frequency oscillator as recited in claim 1 wherein said counting means comprises:

a counter for counting said pulsed received signals; and, means responsive to a first pulsed received signal for resetting and energizing said counter during said predetermined time period.

3. Means for energizing said beat frequency oscillator as recited in claim 2 wherein said automatic direction finder includes an automatic gain control circuit wherein pulsed signals corresponding to said received pulsed signals are present, said counting means counting said pulsed signals in said automatic gain control circuit whereby said pulsed received signals are counted.

4. Means for energizing said beat frequency oscillator as recited in claim 3 wherein said counting means comprises means for generating pulses standardized both as to time duration and amplitude in response to said pulsed signals in said automatic gain circuit, said standardized pulses being counted by said counter.

5. Means for energizing said beat frequency oscillator as recited in claim 4 wherein said means for resetting and energizing said counter comprises a first one-shot triggered by a first standardized pulse, the output pulse of said first one-shot resetting and thereafter energizing said counter during the period of said output pulse.

6. Means for energizing said beat frequency oscillator as recited in claim 5 wherein said beat frequency oscillator is energized generally while said standardized pulses are occuring at least at a first repetition rate and groups of said pulsed signals are occurring at least at predetermined periodic intervals, said first one-shot having an output pulse period of time length sufficient to ensure the occurrence of a number of standarized pulses at least equal to said predetermined count during said output pulse period if said pulsed signals are occurring at least at said first repetition rate; standardized wherein said means responsive to said counting means output signal comprises means for energizing said beat frequency oscillator for at least a period equal to one of said periodic intervals.

7. Means for energizing said beat frequency oscillator as recited in claim 6 wherein said means responsive to said counting means output signal comprises:

switching means enabled by an enabling signal for energizing said beat frequency oscillator; and, a second one-shot triggered by said counting means output signal to generate an output pulse having a time length at least as long as one of said periodic intervals, said output pulse comprising said enabling signal.

8. Means for energizing said beat frequency oscillator as recited in claim 7 wherein said second one-shot includes a sustaining input means.

* * * * *